United States Patent Office 3,441,683
Patented Apr. 29, 1969

3,441,683
D.C. SIGNALING USING A CAPACITOR STORE TO SPEED RESPONSE TIME
Eberhard Herter, Stuttgart, Germany, assignor to International Standard Electric Corporation
Filed June 22, 1965, Ser. No. 465,868
Claims priority, application Germany, June 30, 1964,
St 22,324
Int. Cl. H04m 1/00
U.S. Cl. 179—84    4 Claims

ABSTRACT OF THE DISCLOSURE

A circuit arrangement for interrogating lines in D.C. signalling systems. The duration of the entire interrogation period is shortened according to the invention by the use of analogue quick storage devices that are connected to one of the line wires during the impression of the interrogating signal. The analogue storage devices, such as capacitors, are immediately disconnected when the interrogation signal applied to the line reaches stability. Another interrogation signal can immediately be impressed on the line and at the same time another analogue quick storage device is also applied to the line to store the voltage level when the line reaches stability. Thus, the invention removes the time previously used for measuring after the line has reached stability. Herein, measurements may be made while the next interrogating signal is being applied.

---

The invention relates to a circuit arrangement for code interrogation in D.C. signalling over lines, particularly telecommunication lines.

In direct current signalling over telecommunication lines, the different signals are obtained by different terminations of the line originating on the transmitting end. Thus, at the terminating end the termination may change from ground level to a resistance ground level. The change of the transmitting-end termination must be sufficient to cause a perceivable change on the receiving end. The change of termination on the transmitting end is investigated by at least one interrogation controlled on the receiving end. For example, a feeder voltage is applied through a series resistor to the line to be investigated and the current through the resistor or the potential drop across the resistor is measured at the line terminals. The measurement is either absolute such as the actuation or release of relays or relative, i.e. comparing it with at least one standard value.

In the interrogating circuits known to the art, the time period required by the line due to transient phenomena charge conversion of the line capacities is accounted for by using a sufficiently large "charging time."

After this time has elapsed the evaluating switching means become effective, thus avoiding receiving erroneous information during the transient phenomenon. In the succeeding "measuring time" M the circuit used to evaluate the feeder voltages furnishes the correct information, because the feeder voltages remain connected with the line after the transient time has ceased.

Thus, the interrogating process is relatively slow. Those skilled in the art have continuously sought to increase the speed of D.C. signalling.

According to the invention, the separate "measuring time" M can be omitted, thereby speeding the signalling process. The means for accomplishing the quick code interrogation of direct current signals on lines, particularly telecommunication lines, at the receiving end, is characterized in this that simultaneously with the application of the interrogating voltage (e.g. +UB) for each measuring magnitude, an analog quick storage device is connected to one of the line wires (e.g. the $a$-wire). The analog quick storage device is used only for the period of said transient phenomena of the line caused by the line capacities. For each interrogating step (I, II, III) long time storing and the evaluation of the contents of the analog quick storage device are carried out only after feeding the interrogation signal into the line. Thus, together with each evaluation, the succeeding interrogating voltage is applied to the line and the next following measuring magnitude is stored into another of the analog short time storage devices.

In this way, the duration of the entire interrogation is shortened to the sum of the charging periods for the individual interrogating steps.

According to the invention, prior to the evaluation of an interrogation, the sums and differences of the measuring magnitudes, contained in the analog short time storages, are formed. The inventive arrangement is independent of fixed reference potentials and permits the measuring magnitudes, stored for a short time, to be evaluated centrally. The central evaluating circuit is required only once for several interrogating steps and consequently, offers further advantages. For example, the evaluating circuit can comprise a high responding sensitivity or threshold value characteristic device, a switching amplifier and an overload limiter.

To store measuring voltages for short time, capacitors are very suitable, the capacity should be small compared with the line capacity. Through such capacitors the time constant of the transient phenomenon is not changed essentially, so that the "charging periods or times" L can be maintained. The same voltage is applied to the capacitors as to the line to be interrogated. For proper functioning of a circuit arrangement, according to the invention, it is necessary, that switching contacts such as relay contacts are arranged to connect the capacitors with the line and with the central evaluating circuit.

The invention will be described using the following signals:

(1) $a$-wire grounded via resistor R and $b$-wire directly grounded,
(2) $a$-wire directly grounded and $b$-wire grounded via resistor R.

The signals could, of course, encompass other arrangement such as a wire directly grounded, a wire resistance grounded, a wire resistance grounded through a positive going diode, a wire resistance grounded through a negative going diode and a wire grounded through a diode.

The inventive interrogating arrangement offers particular advantages. In D.C. signalling, the polarity of a very small voltage difference between the $a$-wire and the $b$-wire must be evaluated by means such as differential amplifiers. Such differential amplifiers are then considerably over excited when the signal used as $a$-wire directly grounded, $b$-wire not grounded. It is also possible that current flows from the not grounded wire to the grounded wire through the differential amplifier, wherefrom the evaluating circuit erroneously concludes that the $a$-wire and the $b$-wire are grounded. Also, in D.C. signalling, longitudinal voltages on the wires may cause considerable troubles. Since the operating range is narrowed, in that for example, when using a differential amplifier with two transistors, such as are known to the art, none of the emitter potentials, determined by the line wires should be more negative than the corresponding collector potential.

All these disadvantages are avoided in the arrangement according to the invention. Via the capacitor, inserted between $a$-wire and $b$-wire, no direct current can flow which could be erroneously interpreted at the evaluation.

In the arrangement according to the invention, the line is not loaded by the evaluating circuit at the moment of interrogation.

The inventive circuit arrangement for code interrogation in direct current signalling via lines is now in detail explained with reference to the accompanying drawings, wherein.

Brief description

Figure 1:
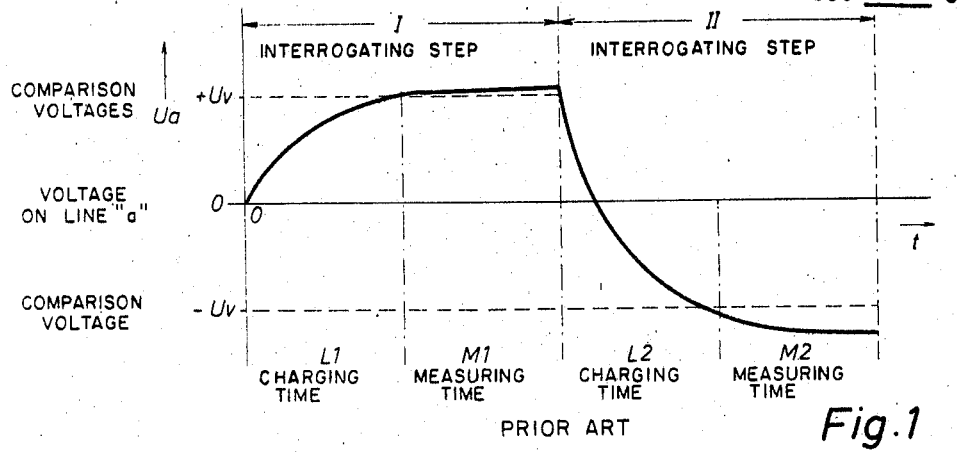
FIG. 1 shows in a diagram the time process of the interrogation in methods known to the art.

FIG. 1 illustrates a timing situation found in prior art D.C. signaling systems. The reason for signaling is irrelevant; the signals could be a dial pulse train, a telegraph signal, or the like. During time L1 (FIG. 1) the signal is built up to full power, and the signal is read out during time M1. The next signal builds up during time L2, and it is read during time M2. Thus, two successive cumulative time periods I and II are required to read two successive signals. The invention shortens the time by deleting the read periods M1 and M2. As shown in FIG. 3, for example, the two contacts $m1$ close during time L1, and the capacitor C1 stores a change representing the voltage $+Uv$. Then the two contacts $m1$ open and the two contacts $m2$ close to charge capacitor C2 to a value representing the next signal voltage. Meanwhile, contacts $n1$ close to read the charge stored on capacitor C1. This way, one signal may be read during the time while the succeeding signal is being stored. Thus, the time scale of FIG. 1 is shrunk to become that of FIG. 2 by the deletion of the M time periods.

In greater detail, FIG. 3 shows a signal wire $a$ which might be any means having utility as a D.C. transmission medium. For example, it could be the tip or ring side of a telephone line; or, it could be a telegraph line. The contacts $m1$, $m2$, ... etc. are for gating a signal into storage. The contacts $n1$, $n2$ ... etc. are for gating stored signals into a readout device AW. The capacitors C1, C2 ... etc. are the means for individually storing the signals. The resistors R3, R4 and R5, R6 are two voltage dividers for setting the levels from which the stored voltages are read. The resistors R1, R2 are current limiting to prevent a direct short circuit across the battery $+UB$ and $-UB$ when the contacts $m1$, $m2$ close.

In the methods known to the art, shown in FIG. 1, the voltage $Ua$ of the $a$-wire increases at the receiving end of the line during the charging period L1 in the interrogating step I. We do not know and do not care how or why it takes the times L1, L2 for the signals to build up to full strength. The only point is that something—such as distributed inductance or capacitance—precludes an instantaneous change in signal level. During the measuring time M1 in the interrogating step I, exceeding of the comparison voltage $+U_v$ is evaluated, for example. The following interrogating step II is again composed of charging time L2 and measuring time M2.

Figure 2:
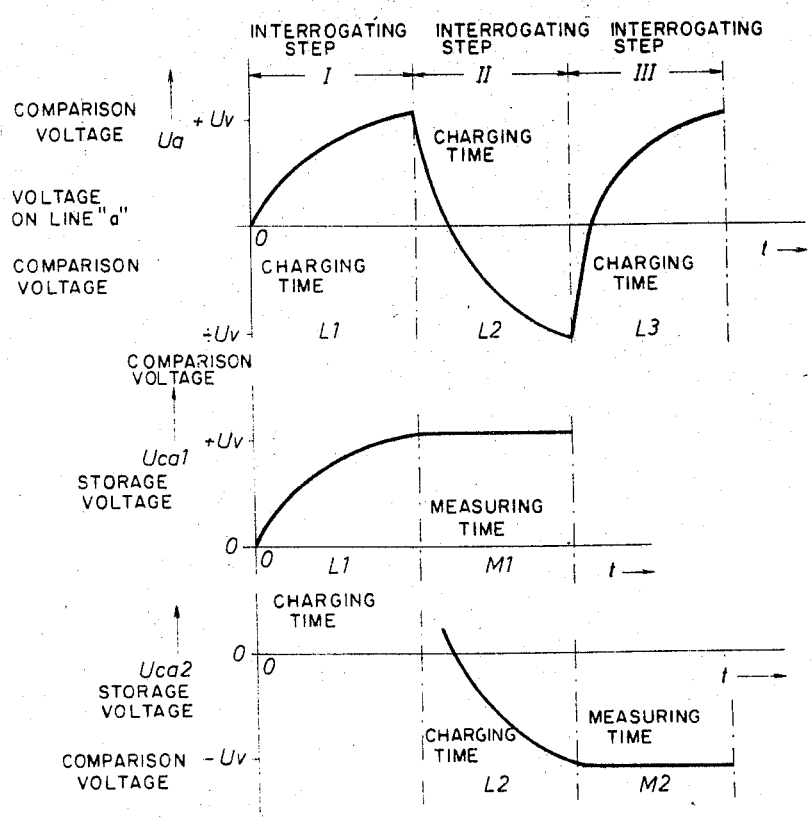
FIG. 2 shows in three diagrams the time process of the interrogation according to the inventional method.
Figure 3:
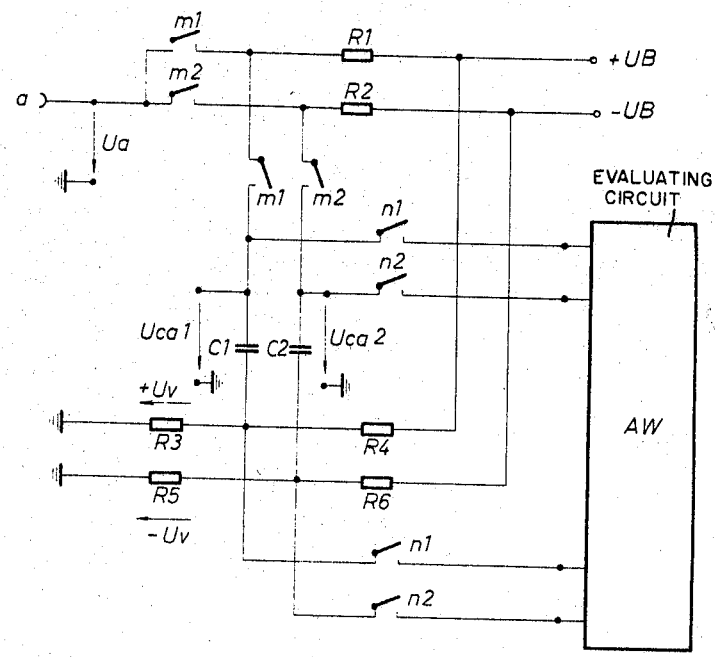
FIG. 3 shows an example for a circuit arrangement according to the invention.

FIG. 2 shows the timely process of three voltages according to the inventive method, occurring in an arrangement as represented in FIG. 3. The top curve shows the voltage $Ua$ of the $a$-wire on the receiving end of the line.

In each interrogating step I, II, III the line is only charged during the transient time and the analog short-time storage is removed at the end of each charging time L1, L2, L3.

The center curve shows the voltage $Uca1$ at a first storage, the bottom curve shows the voltage $Uca2$ at a second storage. The voltages $Uca1$ and $Uca2$ follow in the first portion during the charging times L1 and L2 respectively, the course of the voltage $Ua$ on the $a$-wire of the line. At the end of the charging period (e.g. L1) the storages are disconnected and place their charging voltage at the disposal of the evaluating circuit during the measuring time (e.g. M1).

FIG. 3 shows an example of the circuit arrangement according to the invention. When the contacts $m1$ are closed the capacitor C1 is impressed with the battery voltage $+UB$, simultaneously with the $a$-wire through the resistor R1. The charging voltage $Uca1$ shows the curve represented in FIG. 2. After the contacts $m1$ have opened and after the contacts $n1$ have closed, the difference between the charging voltage $Uca1$ and the comparing voltage $+Uv$, obtained from the battery voltage $+UB$ via the resistors R3, R4, is applied to the evaluating circuit AW.

In a second interrogating step the $a$-wire and the capacitor C2 are connected with the negative battery voltage $-UB$ through the contacts $m2$ and the resistor R2. For evaluation the capacitor C2 is connected with the evaluating circuit AW through contacts $n2$.

Figure 4:
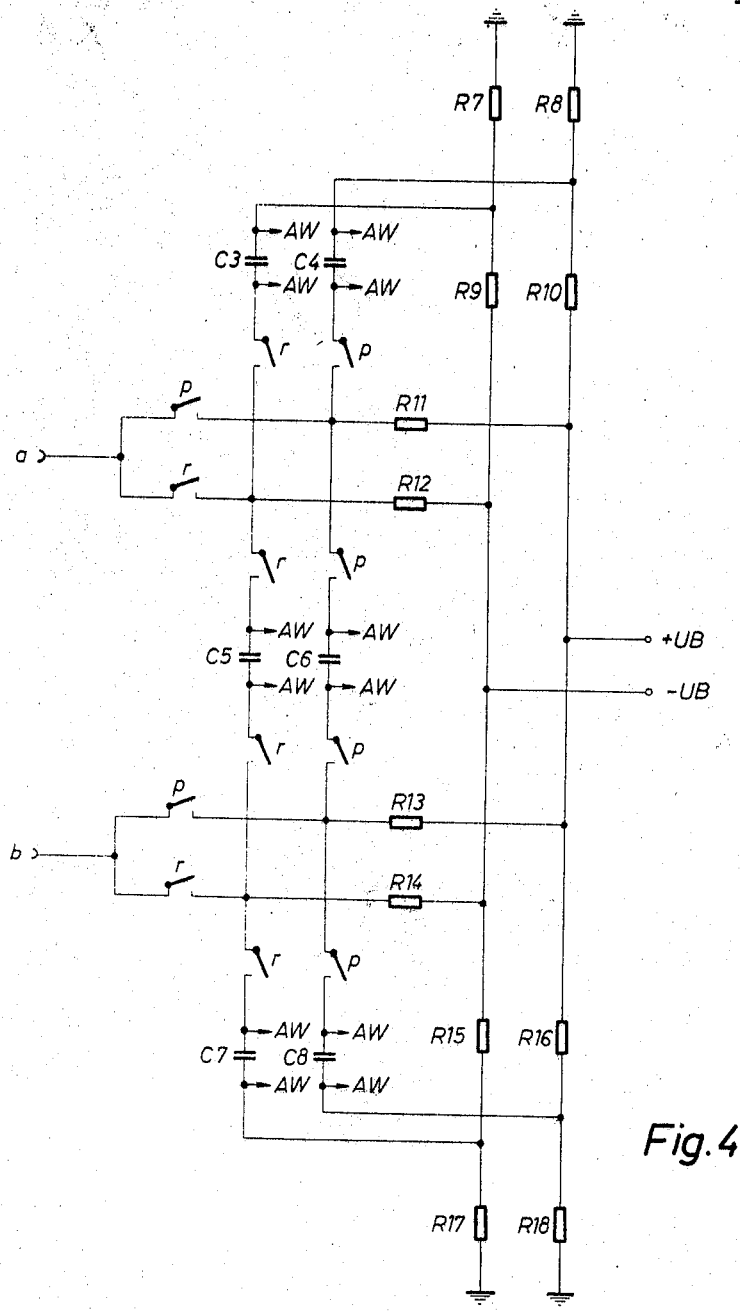
FIG. 4 shows the application of the method according to the invention in a proposed arrangement, using the potential difference of the wires.

FIG. 4 shows the application of the method according to the invention in an arrangement proposed, using the potential difference of the wires which occurs at direct grounding of the wires and at indirect grounding through a resistor respectively. The connections of the capacitors C3 to C8 with the evaluating circuit are indicated by arrows, pointing towards the letters AW.

The resistors R7 and R8, R9 and R10, R15 and R16, R17 and R18 respectively serve to generate voltages for comparison purposes.

The line wires $a$, $b$ and the capacitors C3 to C8 are charged by the battery voltages $+UB$ $-UB$ respectively via the resistors R11, R13, R12, R14 respectively. Connection is made through the contacts $p$ and $r$ respectively. The potential difference between both wires is applied to capacitors C5 and C6.

While the principles of the invention have been described above in connection with specific apparatus and applications, it is to be understood that this description is made only by way of example and not as a limitation on the scope of the invention.

I claim:

1. A system for interrogating direct current signals on the receiving end of telecommunication lines,
said lines comprising line wires,
each of said line wires having a characteristic transient time,
a plurality of analog short time storage means,
interrogating voltage means,
said interrogating voltage means comprising a first voltage source providing a voltage of one polarity, and a second voltage source providing a voltage of an opposite polarity,
each of said voltage sources coupled to ground through voltage divider means,
one side of each of said analog storage means coupled to an intermediate point on an associated one of said voltage divider means,
first switch means for simultaneously connecting said first interrogating voltage source to at least one of the line wires of said line and for connecting the other side of one of said analog short time storage means to said at least one of said line wires,
said first switch means maintaining the connections for the period of the transient time of said at least one of said line wires,
means for evaluating the contents of said analog storage means,
second switch means for simultaneously connecting said second interrogating voltage source to said at least one of the line wires of said line and for connecting the other side of another one of said analog short storage means to said at least one of said line wires for the period of the transient time of said at least one of said line wires, third switch means for connecting said evaluating means with said one analog short time storage means at the end of said transient time of at least one of said wires, said second switch means operating simultaneously with said third switch means, and fourth switch means for connecting said evaluating means to said other analog storage means simultaneously with the release of said second switch means.

2. The system of claim 1 and means whereby the measuring magnitudes, stored for a short time, are evaluated centrally in said evaluating means.

3. The system of claim 2 and means whereby capacitors are used as said short time analog storage means, the capacity of which is small compared with the capacities of the line.

4. The system of claim 3 and means including relay contacts for connecting the capacitors with the line and with the centralized evaluating circuit means.

References Cited

UNITED STATES PATENTS 2,967,212   1/1961   Burstow et al.

WILLIAM C. COOPER, *Primary Examiner.*